US012309156B2

(12) United States Patent
Adur et al.

(10) Patent No.: US 12,309,156 B2
(45) Date of Patent: May 20, 2025

(54) CONTENT SHARING IN AN ENTERPRISE DIGITAL SPACE

(71) Applicant: Omnissa, LLC, Mountain View, CA (US)

(72) Inventors: Anoop Adur, Karnataka (IN); Saurav Choudhuri, Karnataka (IN); Aditya Ulman, Karnataka (IN); Makrand Sethi, Karnataka (IN); Aiswariya Chittedathu, Karnataka (IN)

(73) Assignee: Omnissa, LLC, Mountain View, CA (US)

( * ) Notice: Subject to any disclaimer, the term of this patent is extended or adjusted under 35 U.S.C. 154(b) by 320 days.

(21) Appl. No.: 17/716,155

(22) Filed: Apr. 8, 2022

(65) Prior Publication Data

US 2023/0328068 A1 Oct. 12, 2023

(51) Int. Cl.
*H04L 9/40* (2022.01)
*G06F 16/955* (2019.01)

(52) U.S. Cl.
CPC ........ *H04L 63/102* (2013.01); *G06F 16/9562* (2019.01); *H04L 63/0815* (2013.01); *H04L 63/20* (2013.01)

(58) Field of Classification Search
USPC .......................................................... 726/1
See application file for complete search history.

(56) References Cited

U.S. PATENT DOCUMENTS

| | | | | |
|---|---|---|---|---|
| 8,959,507 B2* | 2/2015 | Shen | ....................... | H04L 67/34 717/172 |
| 10,140,430 B1* | 11/2018 | Taralika | ............... | H04W 12/088 |
| 2018/0090135 A1* | 3/2018 | Schlesinger | ............ | G10L 15/22 |
| 2018/0337951 A1* | 11/2018 | Agarwal | .................. | H04L 9/088 |
| 2023/0102496 A1* | 3/2023 | Chakkaravarthy | .... | G06N 20/00 709/217 |

* cited by examiner

Primary Examiner — Sanchit K Sarker
(74) Attorney, Agent, or Firm — Kim & Stewart LLP

(57) ABSTRACT

Systems and methods are described for content sharing in an enterprise digital space. A graphical user interface ("GUI") can include a feature that allows users to save bookmarks in a single location. A user can request to create a bookmark, and a bookmark service can verify that the bookmark satisfies enterprise security policies. The bookmark service can also verify that the bookmark does not violate any access policies associated with the requesting user. The GUI can provide a feature that allows users to share saved bookmarks with other users in the enterprise by searching for individual users or groups. When a user requests to share a bookmark, the bookmark service can verify that the bookmark does not violate any access policies of the intended recipient. To share the bookmark, the bookmark service can utilize a notification service to send a notification to the recipient's user device.

12 Claims, 10 Drawing Sheets

CONTENT SHARING IN AN ENTERPRISE DIGITAL SPACE

BACKGROUND

Bookmarks are a convenient way to save and access websites. For example, after saving a link as a bookmark, a user can simply select the bookmark to activate the associated link without needing to remember and provide the Uniform Resource Locator ("URL").

In an enterprise digital space, employees often have bookmarked links saved across various platforms, such as in notepads, web browsers, and in various collaborative tools. It can be cumbersome to search across the various platforms to find a specific bookmark. This wastes time and can result in an employee losing a bookmark entirely if the employee is unable to remember where it was saved.

Also, current platforms with bookmarking functionality have very limited sharing capabilities. For example, to share a bookmark from a web browser, a user must navigate to the bookmark, open a window to edit the bookmark, copy the bookmark link, and paste the link in another platform to share, such as an email or chat application. Furthermore, enterprises often implement policies that restrict access to certain websites and applications. These policies can be user-based or group-based. Currently, no bookmarking platform has a way of screening bookmarks being shared among employees, so one employee can share a bookmark with another employee who is not permitted to access the bookmarked link.

As a result, a need exists for improved management and sharing of electronic bookmarks.

SUMMARY

Examples described herein include systems and methods for content sharing in an enterprise digital space. Users in an enterprise can enroll their user devices in a Unified Endpoint Management ("UEM") system, which can be any system that allows enterprises to manage work-related applications and data of user devices. The UEM system can manage the enrolled user devices by sending management instructions to a management application installed on the user devices. The management application can include a graphical user interface ("GUI") that allows users to engage in enterprise activities. For example, using the GUI, a user can access applications, data, and other resources of the enterprise.

The GUI can include a feature that allows users to save, organize and share bookmarks. A bookmark can include any type of electronic link that provides direct access to an application or document, such as a web page. The UEM system can implement certain security measures before allowing a user to save a bookmark. For example, the UEM system can verify that the bookmark points to a valid destination by testing the associated link. As an example, the UEM system can send a Hypertext Transfer Protocol Secure ("HTTPS") call to verify that a response is received. The UEM system can also verify that the bookmarked link meets standards set by the enterprise for secure transmission. For example, for a website, the UEM system can ensure that the website is accessible using a single sign-on ("SSO") protocol or lightweight directory access protocol ("LDAP"), or that the website uses HTTPS protocol. The UEM system can also check the domain of the bookmarked link against any whitelists or blacklists. These security measures can help prevent users from saving bookmarks that could be unsecure and thereby allow unauthorized access to the enterprise's network or otherwise cause harm.

The UEM system can also ensure that access policies associated with the user indicate that the user is allowed to save the bookmarked link. For example, users in the enterprise can be assigned a set of policies that designate websites and applications that the users can access, or security standards for websites and applications based on the user's role in the enterprise. The access policies can be user specific, based on one or more groups the user belongs to, or both. As an example, a user in a customer service group may have permission to access any secure website (e.g., any website that uses HTTPS protocol), but a user in a financial group may be restricted to certain approved domains because of the sensitive information that finance users have access to. If the bookmark violates any user or group access policies, then the UEM system can deny the user from saving the bookmark. However, if the bookmark satisfies the access policies, then the UEM system can allow the user to save the bookmark to his profile. The user can then have access to the bookmark on any enrolled user device that the user logs into, such as by using an enterprise application on the enrolled user devices.

The GUI can include a feature that allows users to share bookmarks with other users in the enterprise. For example, a first user can select an option in the GUI for sharing a bookmark, which can cause a search window to appear. The first user can input a name or identifier ("ID") of a second user and select to share the bookmark with that user. The GUI can also allow the first user to search for user groups in the enterprise, allowing the user to quickly share a bookmark with all the users assigned to that group. For example, if a user in the financial department finds a website with an article that has important information for all the users in the financial department, then the user can bookmark the website and select to share it with the financial group. This can cause the UEM system to share the bookmark with all the users assigned to the financial group.

In addition to sharing individual bookmarks, users can share bookmark folders. For example, users can create folders in the GUI to organize their bookmarks. These bookmark folders can be shareable in the same way that an individual bookmark can be shared. As an example, a supervisor can save a set of relevant bookmarks for new employees in a folder. When a new employee is hired under the supervisor, the supervisor can share the entire folder instead of having to share each individual bookmark.

When a user requests to share a bookmark, before executing the share, the UEM system can verify that the bookmarked link does not violate access policies of the recipient(s). For example, if a first user requests to share a bookmark with a second user, the UEM system can verify that the bookmarked link does not violate access policies associated with the second user. If the first user requests to share a bookmark with a user group, then the UEM system can verify that the bookmarked link does not violate access policies associated with the user group. The UEM system can also verify that the bookmarked link does not violate access policies for each user in the user group. If the group's policies allow the bookmarked link, but the policies of one or more users in the group do not, then the UEM system can share the bookmark with only those users in the group whose policies are not violated.

The UEM system can utilize a notification system for executing bookmark sharing. For example, when a user shares a bookmarked link with another user in the enterprise, the UEM system can cause a notification service to send notifications to user devices associated with the recipient(s). The notification can be any kind of electronic notification, including a push notification or a web notification. The notification can include an action link that, when selected by the recipient user, saves the shared bookmark to the recipient user's profile. The recipient user can then have the option to share the bookmark with other users in the enterprise.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the systems and methods that may be used to implement content sharing in an enterprise digital space, including examples illustrated in the accompanying drawings. Wherever possible, the same reference numbers will be used throughout the drawings to refer to the same or like parts.

Systems and methods are described for content sharing in an enterprise digital space. A GUI can include a feature that allows users to save bookmarks in a single location. A user can request to create a bookmark, and a bookmark service can verify that the bookmark satisfies enterprise security policies, such as verifying that bookmarked link points to a valid destination, uses secure transmission protocols, is not on a blacklisted domain, and so on. The bookmark service can also verify that the bookmark does not violate any access policies associated with the requesting user. The GUI can provide a feature that allows users to share saved bookmarks with other users in the enterprise by searching for individual users or groups. When a user requests to share a bookmark, the bookmark service can verify that the bookmark does not violate any access policies of the intended recipient. To share the bookmark, the bookmark service can utilize a notification service to send a notification to the recipient's user device.

Figure 1:
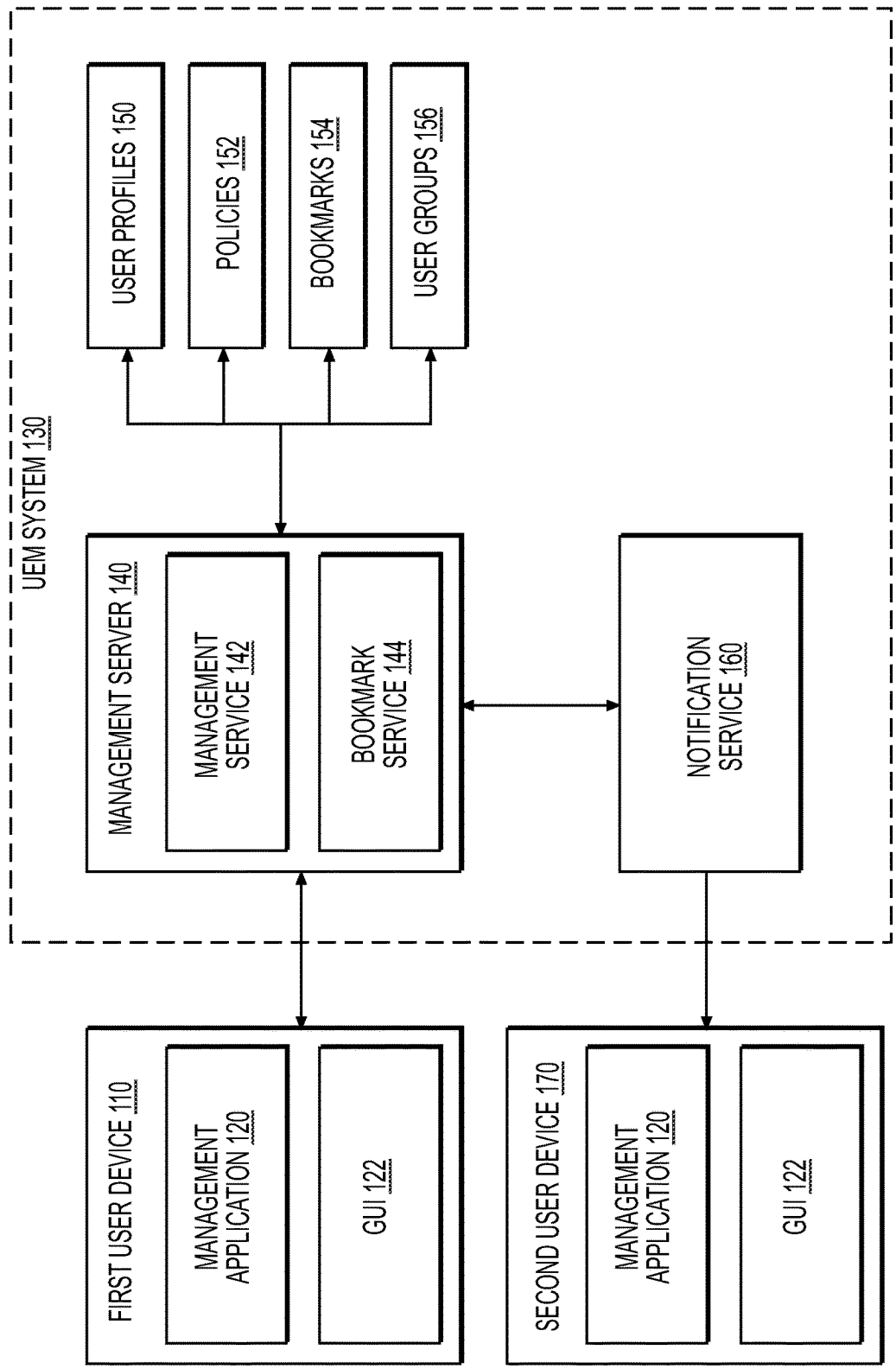
FIG. 1 is an illustration of an example system for content sharing in an enterprise digital space.

FIG. 1 is an illustration of an example system for content sharing in an enterprise digital space. The system can include a first user device 110 and a second user device 170 that are enrolled in a UEM system 130. The UEM system 130 can be any system that allows enterprises to manage work-related applications and data on enrolled user devices, such as by exercising control over enrolled user devices through a management application 120 and management server 140. Users can enroll their own devices, such as cell phones, tablets, or laptops. The first user device 110 and second user device 170 can be enrolled user devices that each belong to or are assigned to a particular user. Alternatively, the user devices 110, 170 can be enrolled as multi-user devices that multiple users can access.

Enrollment can include installing managed applications and other resources on the user device. A management server 140 can manage enrolled user devices by sending management instructions to a management application 120 installed on the enrolled user devices. The management server 140 can be a single server or a group of servers, including multiple servers implemented virtually across multiple computing platforms. The management application 120 can be a stand-alone application, part of an enterprise application, or part of an operating system of the user devices 110, 170.

The management application 120 can be responsible for ensuring that enrolled devices are up to date with compliance and security settings prior to accessing enterprise data and resources. The management application 120 can communicate with a management service 142 on the management server 140, allowing UEM management of enrolled devices based on compliance and security settings at the management server 140. The management application 120 can enforce compliance at enrolled devices, such as by locking a device, notifying an admin, or wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources. The user devices 110, 170 can have access to enterprise or UEM resources through the management server 140.

The first and second user devices 110, 170 can include a user profile 150 of a user, and the user profile 150 can indicate a user group 156 with which the user is associated. The user profile 150 and user group 156 can allow the management server 140 to determine polices 152, such as rules and access rights, that should apply to the user devices 110, 170. For example, management server 140 can apply a different set of policies 152 to the user devices 110, 170 based on their corresponding user profiles 150. The user profiles 150, policies 152, and user groups 156 can be stored in the UEM system 130 in one or more databases, such as a database server.

A GUI 122 for the management application 120 can provide access to UEM resources. For example, the GUI 122 provide access to a library of applications available to a user, such as by displaying application icons and, when an icon is selected by the user, providing single-sign-on authentication for that application on behalf of the user. The GUI 122 can include a feature that allows users to save bookmarks 154 to their personal user profiles 150. This can allow a user to access his saved bookmarks 154 through the management application 120 on any device enrolled in the UEM system 130. For example, GUI 122 can be customized to the user on each of the user's enrolled devices. The user's personal bookmarks 154 can also be provided in the GUI 122 on multi-user devices that the user accesses.

A bookmark 154 can include any electronic link that provides direct access to an application or document, such as a web page. Bookmarks 154 can be managed by the UEM system 130 through a bookmark service 144. The bookmark service 144 can execute as one or more processes on the management server 140. The bookmark service 144 can provide functionality to the GUI 122 for creating and sharing bookmarks 154. For example, when a user creates a bookmark 154 using the GUI 122, the first user device 110 can send data for the bookmark 154 to the management server 140 using a communication protocol like an HTTPS call, or an Application Programming Interface ("API") call. The bookmark service 144 can then perform various operations to verify the bookmark 154. For example, the bookmark service 144 can ensure that the destination address, such as a URL, of the bookmark 154 is valid, ensure that bookmark 154 meets certain policies 152, and so on. If the bookmark service 144 can verify the bookmark 154, then the bookmark 154 can be saved to the user's profile 150. For example, the management server 140 can save the bookmark 154 to a database that stores the user profiles 150 or to a separate database that references the user's profile 150.

The GUI 122 can include a feature that allows a user to share bookmarks 154 with other users associated with the enterprise, such as employees or contractors with a user profile 150 in the UEM system 130. Users can also share bookmarks 154 with user groups 156. The bookmark service 144 can utilize a notification service 160 to send shared bookmarks 154 to users. The notification service 160 can be a service that facilitates the distribution of UEM-related notifications to enrolled devices. The notification service 160 can be hosted on a server in the UEM system 130 or, alternatively, the notification service 160 can be provided by a third party. For example, when a user shares a bookmark 154 with another user, the management server 140 can send instructions to the notification service 160 for creating a notification for the bookmark 154. The instructions can include a user ID for the user profile 150 or a group ID for the user group 156 that should receive the notification. The notification service 160 can then generate the notification for the bookmark 154 and send the notification to the user device(s) of the identified users. The notification service 160 can send the notifications using an API call or other communication protocol. The notification can be any kind of digital notification. For example, the notification can be a notification that is displayed within GUI 122 of the management application 120, a push notification that appears outside the GUI 122, such as in the operating system ("OS") interface of a device, a web notification that appears in a web browser, or any combination of these.

As example, using the GUI 122, a first user of the first user device 110 can select to share a bookmark 154 with a second user of the second user device 170. The first user device 110 can send a message to the management server 140 using an API call. The message can include the second user's user ID and identify the bookmark 154 being shared. The management server 140 can send instructions to the notification service 160 for sending a notification to the second user based on the message. The notification service 160 can generate the notification and send the notification to the second user device 170. The shared bookmark 154 can then appear on the second user device 170 as a notification.

Figure 2:
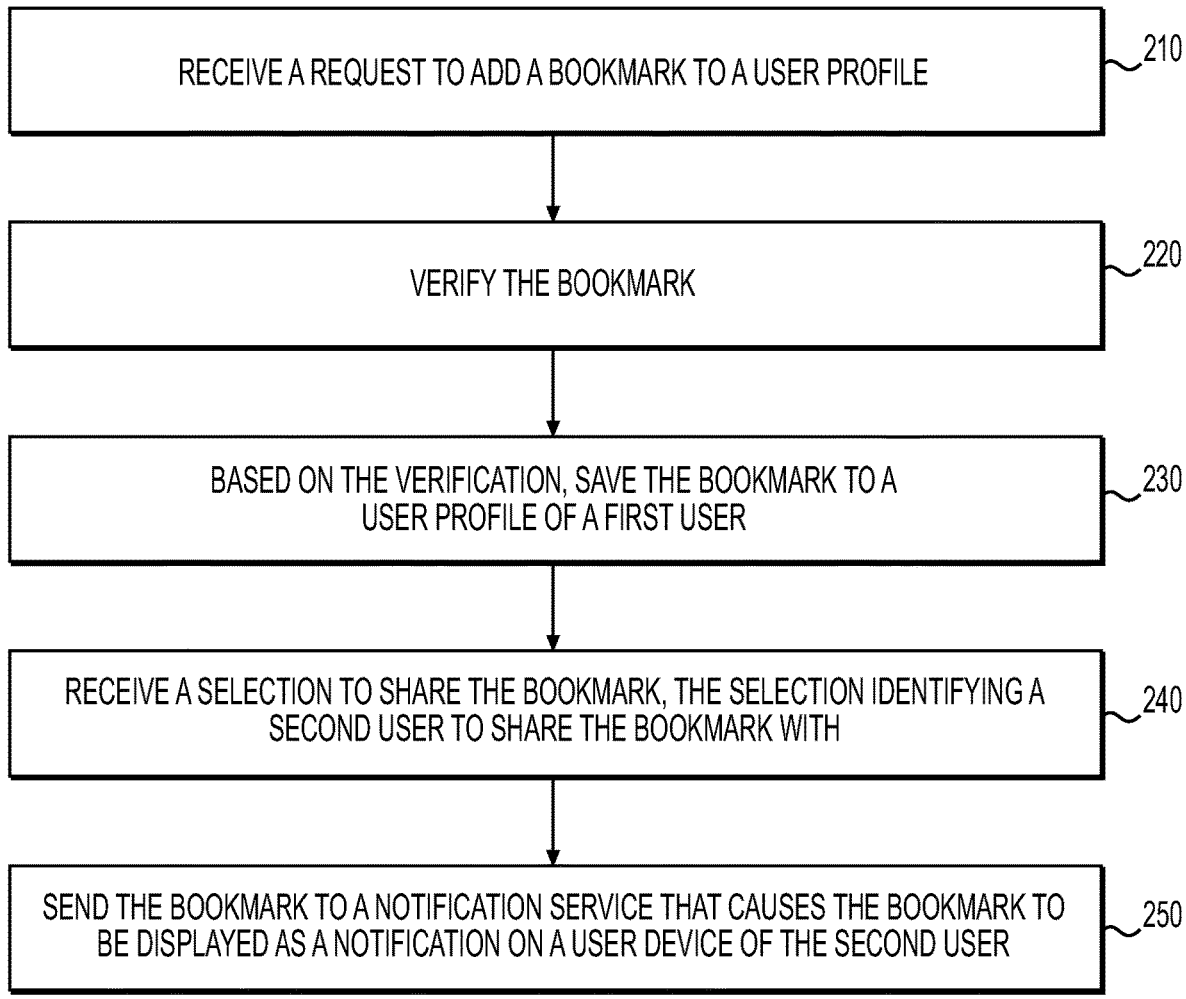
FIG. 2 is a flowchart of an example method for content sharing in an enterprise digital space.

FIG. 2 is a flowchart of an example method for content sharing in an enterprise digital space. At stage 210, the bookmark service 144 can receive a request to add a bookmark to a user profile 150. For example, the GUI 122 can include a selection mechanism, such as a button, that a user can select to save a bookmark 154 to his profile 150. The user can select the button, and the GUI 122 can respond by displaying a window for creating a bookmark 154. The user can then input information for the bookmark 154. For example, the user can input a destination address, such as a URL for a website, and a custom name for the bookmark 154. The management application 120 can then cause the user device 110 to send a request with the bookmark information to the management server 140, which can then be accessed by the bookmark service 144.

At stage 220, the bookmark service 144 can verify the bookmark 154. Verifying the bookmark can be a multi-step process. In one step, the bookmark service 144 can verify that the bookmark 154 directs to a valid destination. For example, if the bookmark 154 is a URL for a website, then the bookmark service 144 can send an HTTPS request with the URL to make sure a response is received. In another step, the bookmark service 144 can verify that the website meets security standards required by the UEM system 130. For example, the bookmark service 144 can verify that the website is accessible via SSO or LDAP or is otherwise secure, such as by using HTTPS protocol. In another step, the bookmark service 144 can determine whether the website's domain is on any blacklists and whitelists.

In one verification step, the bookmark service 144 can compare the bookmark 154 to the policies 152 to determine whether the user is allowed to save the bookmark 154. For example, the policies 152 can designate websites and applications that certain users or user groups can and cannot access. For example, a user in a customer service group may have permission to access any secure website, but a user in a financial group may be restricted to certain approved domains.

At stage 230, the bookmark service 144 can save the bookmark 154 to a user profile 150 based on the bookmark 154 being successfully verified. For example, the bookmark service 144 can save the bookmark 154 to a database that stores user profiles 150. Alternatively, the bookmark 154 can be saved in a data table that references the user's profile 150, such as with a user ID. Bookmarks 154 in the user's profile can be displayed in the GUI 122 when the user opens the management application 120 on a device or accesses the GUI 122 through a web browser.

At stage 240, the bookmark service 144 can receive a selection to share the bookmark 154. For example, the GUI 122 can display an icon for each bookmark 154 saved to the user's profile 150. The icon can include a selection mechanism, such as a drop-down menu, such that the user can select an option for sharing the bookmark 154 with other users in the enterprise. In response, the GUI 122 can display a recipient selection window that allows the user to search for other users or groups to share the bookmark 154 with. For example, the recipient selection window can include a search feature with a search bar. The user can input the name of a user, a user ID, or the name of a user group 156. The GUI 122 can display a list of users and user groups 156 based on the user input. For example, as the user inputs text, the bookmark service 144 can match the text to the user profiles 150 and user groups 156 and cause the GUI 122 to display the matches. The user can then select the user or group 156 that he desires to share the bookmark 154 with. The GUI 122 can also allow the user to select multiple users or groups for sharing the bookmark 154.

In addition to sharing individual bookmarks 154, users can share bookmark folders. For example, users can create folders in the GUI 122 to organize their bookmarks 154. These bookmark folders can be shareable in the same way that an individual bookmark 154 can be shared. As an example, a supervisor can save a set of relevant bookmarks 154 for new employees in a folder. When a new employee is hired under the supervisor, the supervisor can select to share the entire folder instead of having to share each individual bookmark 154.

At stage 250, the bookmark service 144 can send instructions to the notification server 160 for sending a notification about the shared bookmark. The notification service 160 can then generate a notification and send the notification to the appropriate user devices 110, 170. For example, the bookmark service 144 can create the instructions from a template stored in the UEM system 130. The instructions can be any kind of message or data file that the notification server 160 can use to send notifications, such as a Hypertext Markup Language ("HTML"), Extensible Markup Language ("XML") file, or JavaScript Object Notation ("JSON") file.

The instructions can include any content to display in the notification, IDs of user devices that should receive the notification, and any other related information for the notification. Display content can include a message to display along with an image, such as a thumbnail of an image from the bookmarked web page. The instructions can also designate an action link to include in the notification. An action link can be a component of a notification that a user can interact with. As an example, the notification can include a link that a user can select to save the shared bookmark 154 or a link that causes the user's browser to open the shared bookmark 154.

The bookmark service 144 can be configured to perform an additional verification step based on the user(s) selected for sharing the bookmark 154. For example, the bookmark service 144 can verify that the bookmark 154 does not violate the policies 152 of the recipient user or user group. If the bookmark 154 does violate a policy, then the GUI 122 can display a message that the bookmark 154 cannot be shared with the selected recipient. The first user can belong to a user group 156 that has more restrictive policies 152 than a user group 156 of a second user. So, the second user may be allowed access some web pages that are prohibited to the first user. If the second user attempts to share a bookmark 154 with the first user that the first user is not allowed to access, then the bookmark service 144 can deny the share based on the policies 152.

Figure 3:
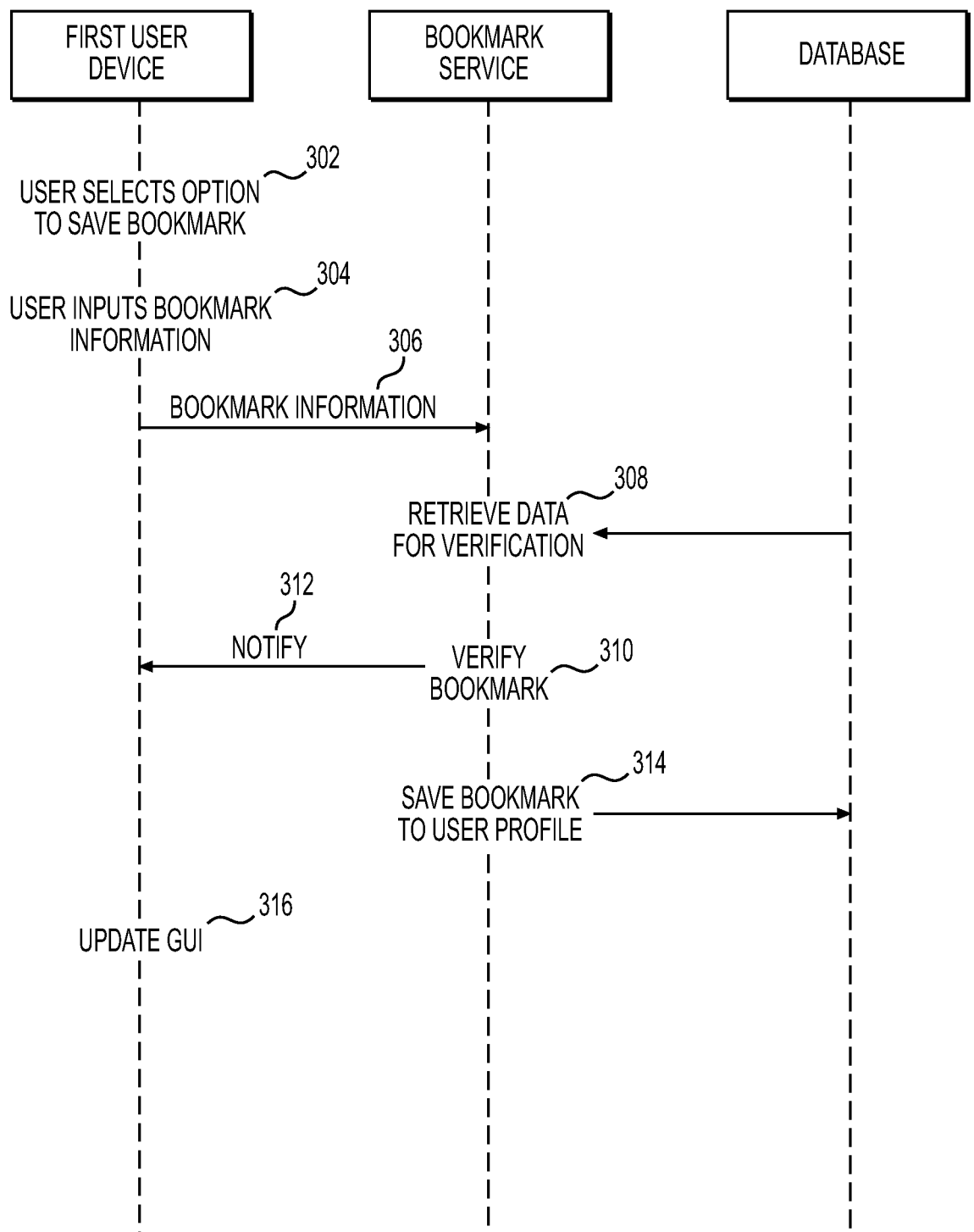
FIG. 3 is a sequence diagram of an example method for saving a bookmark in an enterprise digital space.

FIG. 3 is a sequence diagram of an example method for saving a bookmark 154 in an enterprise digital space. At stage 302, a user can select an option in the GUI 122 for saving a bookmark 154. The user can select the save option using a selection mechanism in the GUI 122 of the management application 120. Selecting the save option can cause the GUI 122 to display a windows or page for creating a bookmark 154 to save to the user's profile.

At stage 304, the user can input information for the bookmark 154 into the GUI 122. For example, the user can input the bookmark's 154 URL, a custom name, and any other information allowed by the GUI 122. For example, the GUI 122 can allow the user to organize bookmarks 154 into folders and the user can designate a folder to save the bookmark 154 to. In some examples, stage 304 is performed automatically by the first user device 110, such as by extracting a URL from a website that the GUI 122 was displaying at the time the user selected the option to save the bookmark 154 in stage 302.

At stage 306, the first user device 110 can send the bookmark information to the bookmark service 144. For example, the user device 110 can make an API call to the management server 140 with the bookmark information, which the bookmark service 144 can then access. In another example, the user device 110 accesses a secure communication channel with the management server 140 and provides the bookmark information through that communication channel.

At stage 308, the bookmark service 144 can retrieve data for verifying the bookmark 154 from a database. For example, the bookmark service 144 can have access to user profiles 150, policies 152, and user groups 156 in the UEM system 130. The bookmark service 144 can retrieve general policies 152 as well as policies 152 specific to the user's profile 150 and any groups 156 that the user belongs to.

At stage 310, the bookmark service 144 can verify the bookmark 154. Verifying the bookmark 154 can include multiple steps, including verifying that the bookmark's destination is valid, verifying that the destination meets security standards, and verifying that the user is authorized to access the destination. In verifying that the destination is valid, the bookmark service 144 can attempt to access the destination. For example, if the bookmark 154 is a URL for a website, then the bookmark service 144 can send an HTTPS request with the URL to make sure a response is received. In verifying the security standards, the bookmark service 144 can verify that the destination is accessible via SSO or LDAP or is otherwise secure, such as by using HTTPS protocol. The bookmark service 144 can also compare the destination to any blacklists and whitelists. For example, an enterprise can whitelist websites that would normally be prohibited under the policies 152, and vice versa. In verifying that the user is authorized to access the destination, the bookmark service 144 can determine whether the destination is prohibited by policies 152 specific to the user's profile 150 or a user group 156 that the user belongs to.

At stage 312, if the bookmark 154 passes the verification, the bookmark service 144 can notify the first user device 110. For example, the bookmark service 144 can cause the GUI 122 to display a message indicating that the bookmark 154 was successfully saved to the user's profile 150.

At stage 314, the bookmark service 144 can save the bookmark 154 to the user's profile. This stage can occur before, after, or in parallel with stage 312. Saving the bookmark 154 can include saving the bookmark 154 to a database that stores user profiles 150. Alternatively, the bookmark 154 can be saved in a data table that references the user's profile 150, such as with a user ID.

At stage 316, the first user device 110 can update the GUI 122. For example, the GUI 122 can include an area that displays bookmarks 154 that the user has saved, and the newly saved bookmark 154 can be displayed in that portion of the GUI 122 so that the user can view them simultaneously.

Figure 4:
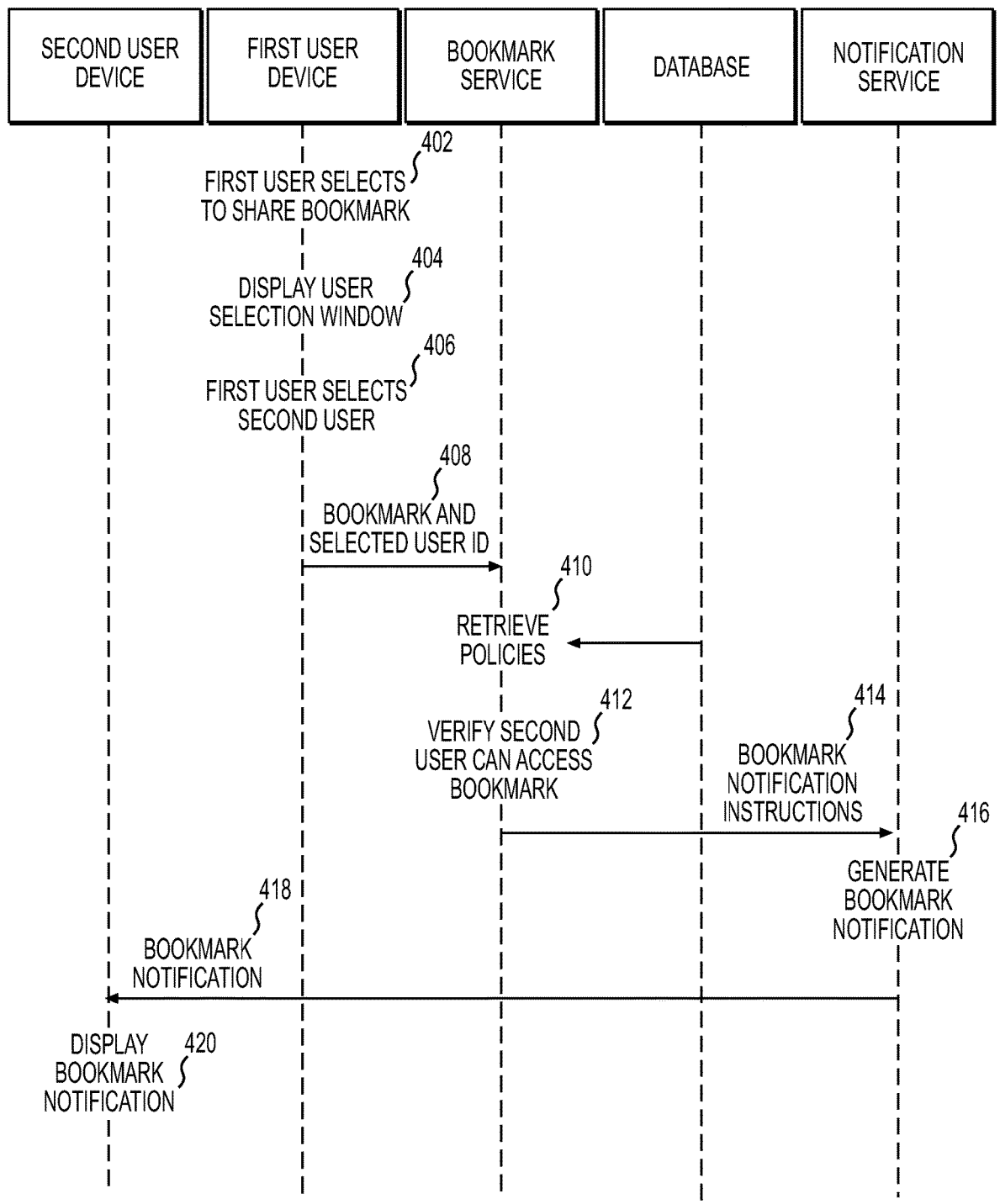
FIG. 4 is a sequence diagram of an example method for content sharing in an enterprise digital space.

FIG. 4 is a sequence diagram of an example method for content sharing in an enterprise digital space. At stage 402, a first user can select an option in the GUI 122 for sharing a bookmark 154. For example, the first user device 110 can display an icon for each bookmark 154 saved to the user's profile 150 in the GUI 122. The icon can include a selection mechanism, such as a drop-down menu, such that that the user can select an option for sharing the bookmark 154 with other users in the enterprise.

In response to selecting the option to share the bookmark 154, at stage 404, the first user device 110 can display a recipient selection window. The recipient selection window can allow the user to search for other users or groups to share the bookmark 154 with. For example, the recipient selection window can include a search feature with a search bar into which the user can input names and IDs of users and groups in the enterprise. The GUI 122 can display a list of entities that the user can share the bookmark 154 with based on text inputted into the search bar. At stage 406, the first user can select a second user to share the bookmark 154 with. In some examples, stage 406 additionally or alternatively includes the first user selecting a user group 156 to share the bookmark 154 with.

At stage 408, the first user device 110 can send the bookmark 154 and second user's user ID to the bookmark service 144. For example, the users and groups displayed in the recipient selection window can be mapped to the corresponding profiles 150 and groups 156 using their respective IDs. By selecting a user, the first user device 110 can indicate to the bookmark service 144 which bookmark 154 the user wants to share and the user ID of the intended recipient. In examples where the first user selects an entire user group 156 at stage 406, then at stage 408 the user ID can be substituted with a user group ID that identifies the relevant user group 156.

At stage 410, the bookmark service 144 can retrieve policies 152 of the second user from a database. For example, the bookmark service 144 can make a database query using the second user's ID, and the database can respond with the second user's access policies. At stage 412, the bookmark service 144 can verify that second user is authorized to access the bookmark 154. In other words, the bookmark service 144 can verify that the bookmark 154 does not violate any policies 152 of the second user. If so, then the bookmark service 144 can instruct the GUI 122 to display a message on the first user device 110 informing the user. In examples where the first user selects an entire user group 156 at stage 406, then at stage 410 the bookmark service 144 can make a database query using the user group ID and receive the user group's 156 access policies 152. In another example, the bookmark service 144 can retrieve policies 152 for each user in the selected user group 156 at stage 410.

If the bookmark 154 does not violate any policies 152 for the second user, then at stage 414, the bookmark service 144 can send instructions to the notification service 160 for sending a notification to the second user device 170. The instructions can include any content to be included in the notification, such as a written message and an image or icon. The instructions can also identify the second user as the recipient and designate any interactive component to include in the notification. The instructions can be created using a template stored in the UEM system 130. At stage 416, the notification service 160 can generate a bookmark notification based on the instructions. If the user shares the bookmark 154 with a user group 156, then the bookmark service 144 can check the bookmark 154 against policies 152 for the user group 156 and policies 152 for each user in the user group 156. The sharing can be denied if the bookmark 154 violates a group policy. If the group policy allows the bookmark 154, but some individual user policies do not, then the bookmark 154 can be shared only with those users in the group 156 whose policies 152 allow the bookmark 154. For example, the bookmark service 144 can share the bookmark 154 with users in the group 156 whose policies 152 allow the bookmark 154 and deny the share for users in the group 156 whose policies 152 do not allow the bookmark 154. The bookmark service 144 can display a notification to the user identifying the users in the group 156 whose policies 152 do not allow the bookmark 154. The GUI 122 can provide an option that allows a user to appeal the denial. Such an appeal can be sent to and reviewed by an admin, and the admin can choose to uphold or overturn the denial. For example, to overturn the denial the admin can add the bookmark 154 to a whitelist, and the bookmark service 144 can then share the bookmark 154 with the remaining users in the group 156.

When a bookmark 154 cannot be shared with another user, such as by violating a policy 152 or security standards, the bookmark service 144 can be configured to attempt to identify and suggest an alternative. For an example, the bookmark service 144 can search for an alternative website with the same or similar content that can be shared. As an example, users sometimes have websites bookmarked for long periods of time, and those websites can be moved or updated without the user knowing. In another example, security policies can be updated so that the bookmark 154 was allowed when the user saved the bookmark 154, but not when the user later attempts to share it. In such instances, the bookmark service 144 can attempt to locate a secure version of an unsecure website, locate a new URL for a moved website, or identify an alternative website with the same or similar content, depending on the circumstances. For example, the bookmark service 144 can extract metadata and keywords from the bookmarked website and use that data to identify alternative options.

As an example, if a bookmarked website uses only HTTPS, then the bookmark service 144 can attempt to identify an HTTPS version of the website. If the URL no longer directs to a valid destination, then the bookmark service can use saved metadata to attempt to identify another URL where the website may have been moved to. If no secure versions of the bookmarked website can be found, then the bookmark service 144 can use metadata and keywords to identify another web site that has the same or similar content. For example, the bookmark service 144 can apply Natural Language Processing ("NLP") (or other techniques for contextually interpreting language) to the bookmarked website and search for another website using the results. If the bookmark service 144 can identify an alternative website that satisfies the security protocol and policies 152, then the bookmark service 144 can recommend the alternative to the user in the GUI 122. The user can select the alternative to view the associated website and choose whether to accept and share the alternative or not. Accepting the alternative can cause the associated bookmark 154 to be updated in the user's profile 150, the alternative to be shared with the selected user, or both.

At stage 418, the notification service 160 can send the bookmark notification to the second user device 170. The second user device 170 can be any user device that belongs to the second user. For example, in an enterprise context, the second user device 170 can include one or more user devices that are enrolled in the UEM system 130 with the second user's profile 150. If the user shares the bookmark 154 with a user group 156, then the notification service 160 can send the notification to user devices for all the users in the group whose individual policies allow the bookmark 154.

At stage 420, the second user device 170 can display the bookmark notification in the GUI 122. The bookmark notification can be displayed in any format that notifies the second user of the bookmark 154 being shared. For example, the bookmark notification can be a push notification that is displayed in a GUI of the operating system ("OS") running on the second user device 170, within the GUI 122 in the management application 120, or as a web-based notification in a web browser. The notification can include an action link that, when selected by the second user, causes the bookmark 154 to be saved to the second user's profile 150. The second user can then have the option to share the bookmark 154 with other users in the enterprise.

In an example, the first user can be notified of what the second user does regarding the shared bookmark 154. For example, if the second user saves the bookmark 154 to his own profile 150, selects the bookmark 154 to open the corresponding link, or shares the bookmark 154 with another user, then the management application 120 on the second user device 170 can notify the bookmark service 144. The bookmark service 144 can then cause the notification service 160 to send a notification to the first user device 110 indicating the action taken by the second user. This can help the first user to know how helpful the shared bookmark 154 was to the second user.

FIGS. 5A-D are illustrations of an example GUI 500 for content sharing in an enterprise digital space. The GUI 500 shown in FIG. 5A can be a page in the GUI 122 for stored bookmarks 154. For example, a user can access the GUI 500 page by selecting the bookmarks tab 505. The GUI 500 includes sections for two types of bookmarks 154: an app section 501 and a web link section 503. The app section 501 includes app bookmarks 502 that can be bookmarks 154 for managed applications in the UEM system 130. Managed applications can allow an enterprise to control access and functionality of the application. Managed applications can persist locally on a user device, can be accessed from within the management application 120, or can be hosted by a web server and accessed through a web browser. If a managed application persists locally on a user device, then selecting the corresponding app bookmark 502 can cause the user device to launch the application. If a managed application can be accessed from within the management application 120, then selecting the corresponding app bookmark 502 can cause the application to be launched within the management application 120. If a managed application is hosted on a web server, then selecting the corresponding app bookmark 502 can cause a web browser on the user device to launch and load the corresponding web page. Alternatively, the web page can be loaded within the management application 120. The management application 120 can store the user's credentials for accessing the web page. When the user selects an app bookmark 502, the management application 120 can pass the user's credentials to the web browser for authentication or provide the credentials directly to the application's web server, depending on whether the website is loaded in a web browser or the management application 120.

The web links section 503 includes web bookmarks 504 that can be bookmarks 154 for websites. For example, web bookmarks 504 can be embedded with a URL. Selecting the bookmark 504 can cause the user device to launch a web browser and make an HTTPS call using the URL. The web links section 503 can include an add button 506 for adding bookmarks 154. The GUI 500 shows an add button 506 for the web links section 503, but the app section 501 can also include this feature. The add button 506 can be any kind of GUI selection mechanism. The bookmark 504 includes a menu button 508 that, when selected, displays options for actions the user can take with the bookmark 504. This is described in more detail with respect to FIG. 5C.

Figure 5A:
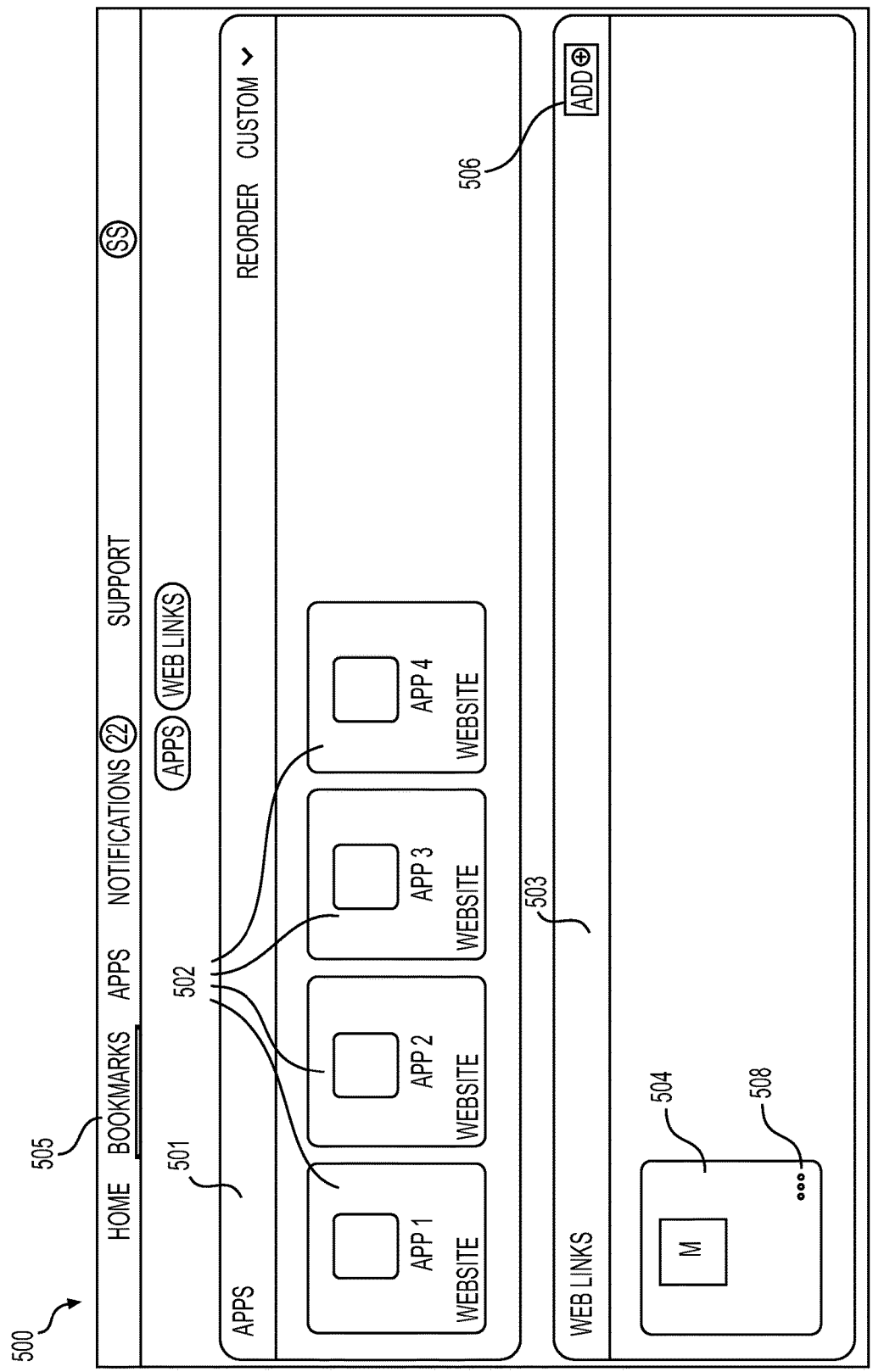
FIGS. 5A-D are illustrations of an example GUI for content sharing in an enterprise digital space.
Figure 5B:
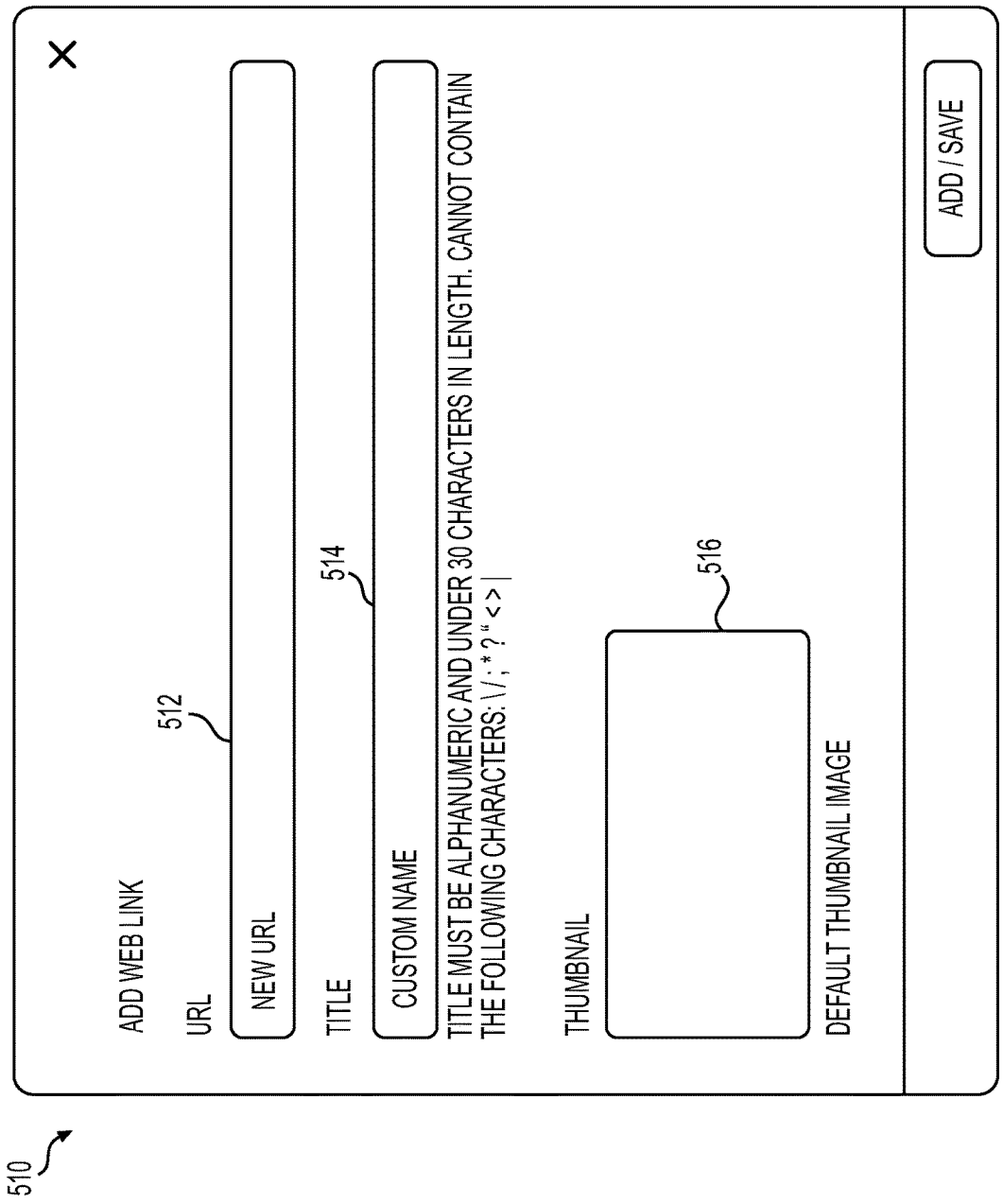

Moving to FIG. 5B, selecting the add button 506 can cause an add bookmark window 510 to be displayed in which the user can add a new bookmark 504. For example, the add bookmark window 510 can include a URL field 512 where the user inputs the URL for the website being added. In some examples, the URL field 512 can be automatically populated by user device, based on any relevant information such as the most recently visited website or application. The add bookmark window 510 can also include a title field 514 that allows the user to give the new bookmark 504 a custom name. The add bookmark window 510 can also include a thumbnail pane 516 that can display a thumbnail from the web page. A thumbnail can automatically be populated in the thumbnail pane 516. For example, after the user enters the URL into the URL field 512, the management application 120 can make an HTTPS call using the URL and extract a thumbnail image from an HTML that it receives from the web server of the website. The management application 520 can then display the thumbnail image in the thumbnail pane 516.

A user can add the new bookmark 504 to his user profile 150 by selecting an add/save button. Selecting the add/save button can cause the bookmark service 144 to attempt to verify the new bookmark 504 using the methods described previously herein. If the bookmark service 144 can verify the new bookmark 504, then it can be added to the web links section 503. If not, then a prompt can be displayed informing the user that the new bookmark 504 cannot be added because it violates enterprise policies 152.

Figure 5C:
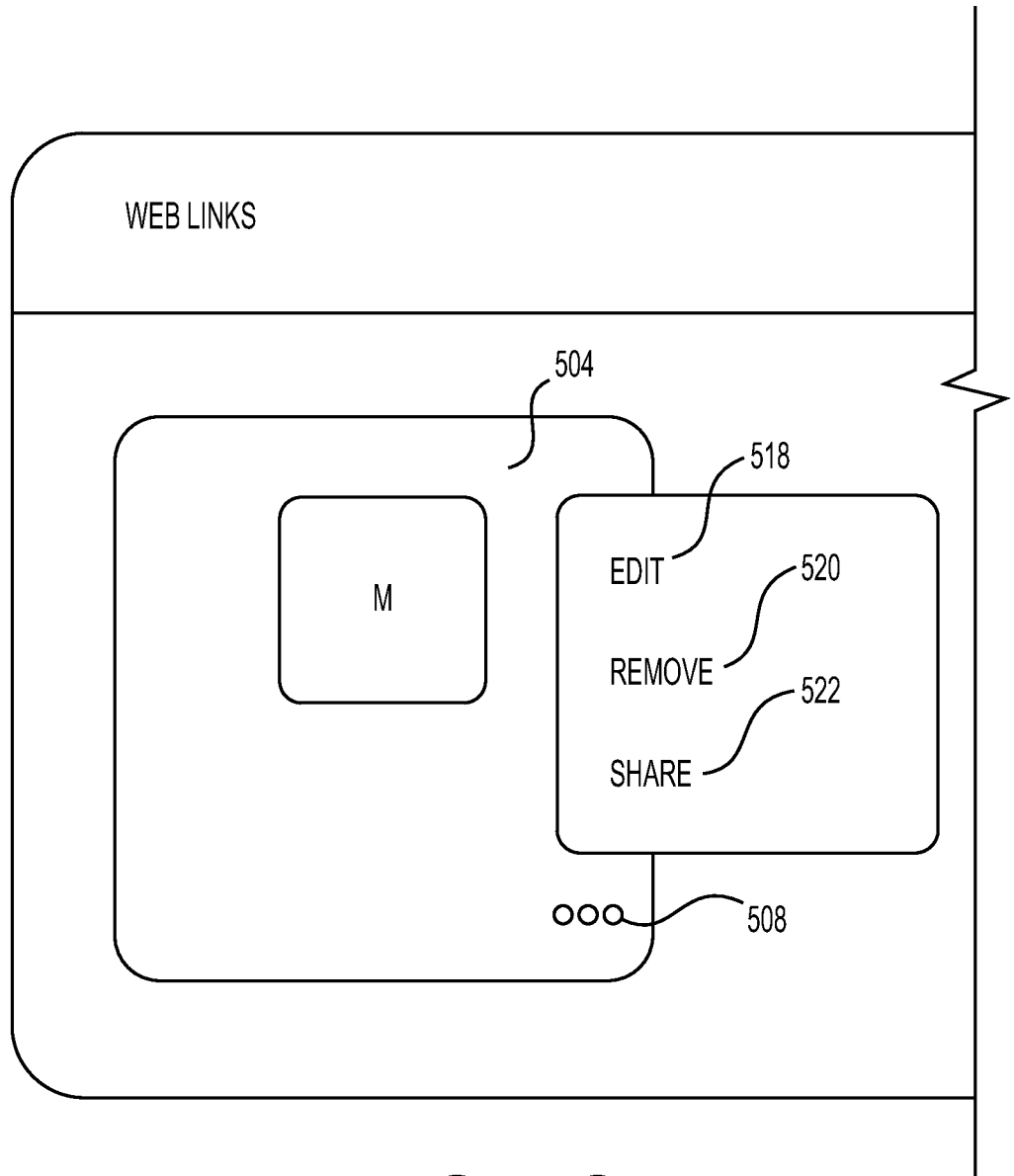

The app bookmarks 502 and web bookmarks 504 can include a feature for sharing with other users in the enterprise. For example, as shown in FIG. 5C, the bookmark 504 includes a menu button 508 that, when selected, displays options for actions the user can take with the bookmark 504. The options can include an edit option 518, a remove option 520, and a share option 522. Selecting the edit option 518 can cause a window similar to the add bookmark window 510 to be displayed that allows the user to change the URL or custom name of the bookmark 504. Selecting the remove option 520 can cause the bookmark 504 to be removed from the user's profile 150. Selecting the share option 522 can cause the share bookmark window 530 of FIG. 5D to be displayed.

Figure 5D:
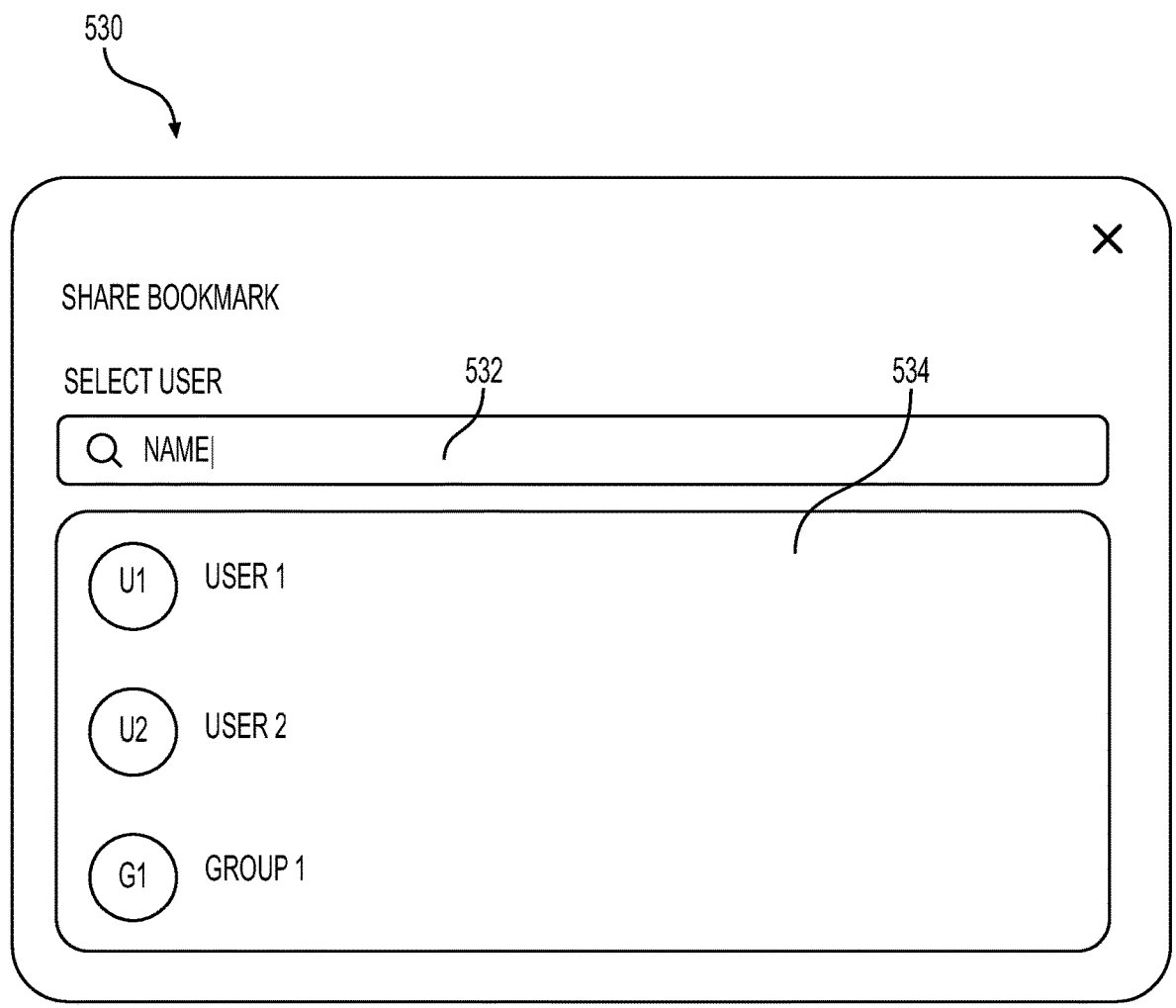

As shown in FIG. 5D, the share bookmark window 530 can include a search field 532 where the user can input the name or an ID of a user or user group 156 that the user wants to share the bookmark 504 with. As the user inputs text, a selection drop down 534 can be displayed with entities that match the provided text, such as users and user groups 156. The user can then select an entity to share the bookmark 504 with. Selecting an entity can cause the bookmark service 144 to verify that the selected entity is authorized to access the bookmark 504. If the entity is not authorized, then a prompt can be displayed informing the user that the new bookmark 504 cannot be shared because it violates enterprise policies 152 for that entity. If the entity is authorized, then the bookmark service 144 can send instructions to the notification service 160 for sending a notification to user devices belonging to the entity. The share bookmark window 530 can allow a user to select multiple entities, which can cause the bookmark service 144 to verify authorization for all entities selected.

Figure 6A:
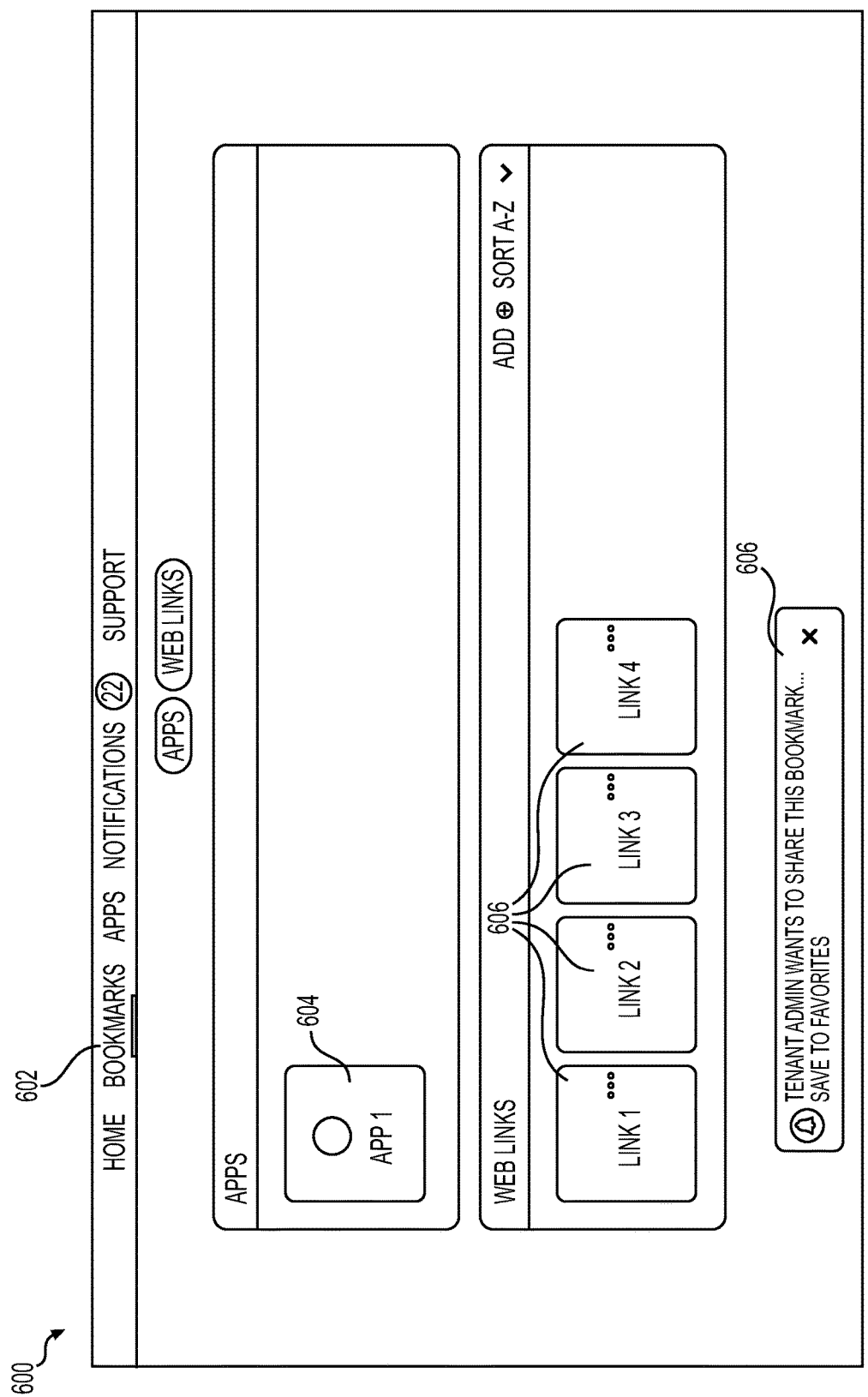
FIGS. 6A and 6B are illustrations of another example GUI for content sharing in an enterprise digital space.

FIG. 6A is an illustration of another example GUI 600 for content sharing in an enterprise digital space. Like FIG. 5A, the GUI 600 can be a page in the GUI 122 for stored bookmarks 154. For example, bookmarks tab 602 can correspond to the bookmarks tab 505, the app link 604 can correspond to the app bookmarks 502, and the web links 606 can correspond to the bookmark 504. The GUI 600 includes a notification 606 of a bookmark 154 that another user has shared. For example, GUI 500 of FIG. 5A can correspond the GUI 122 on the first user device 110 and GUI 600 of FIG. 6A can illustrate the GUI 122 on the second user device 170. A first user of the first user device 110, using the GUI 500, can create the bookmark 504 and select to share the bookmark 504 with a second user of the second user device 170. After the bookmark service 144 verifies that the second user is authorized to access the bookmark 504, the notification service 160 can send the notification 606 to the second user device 170 where it can be displayed in the GUI 600. In some examples, the notification 606 is displayed on a different GUI of the second user device 170. For example, the notification 606 can be an operating-system-level notification that displays on the foreground or lock screen of the second user device 170. In another example, the notification 606 is provided in the form of an email or text message to the second user device 170.

Figure 6B:
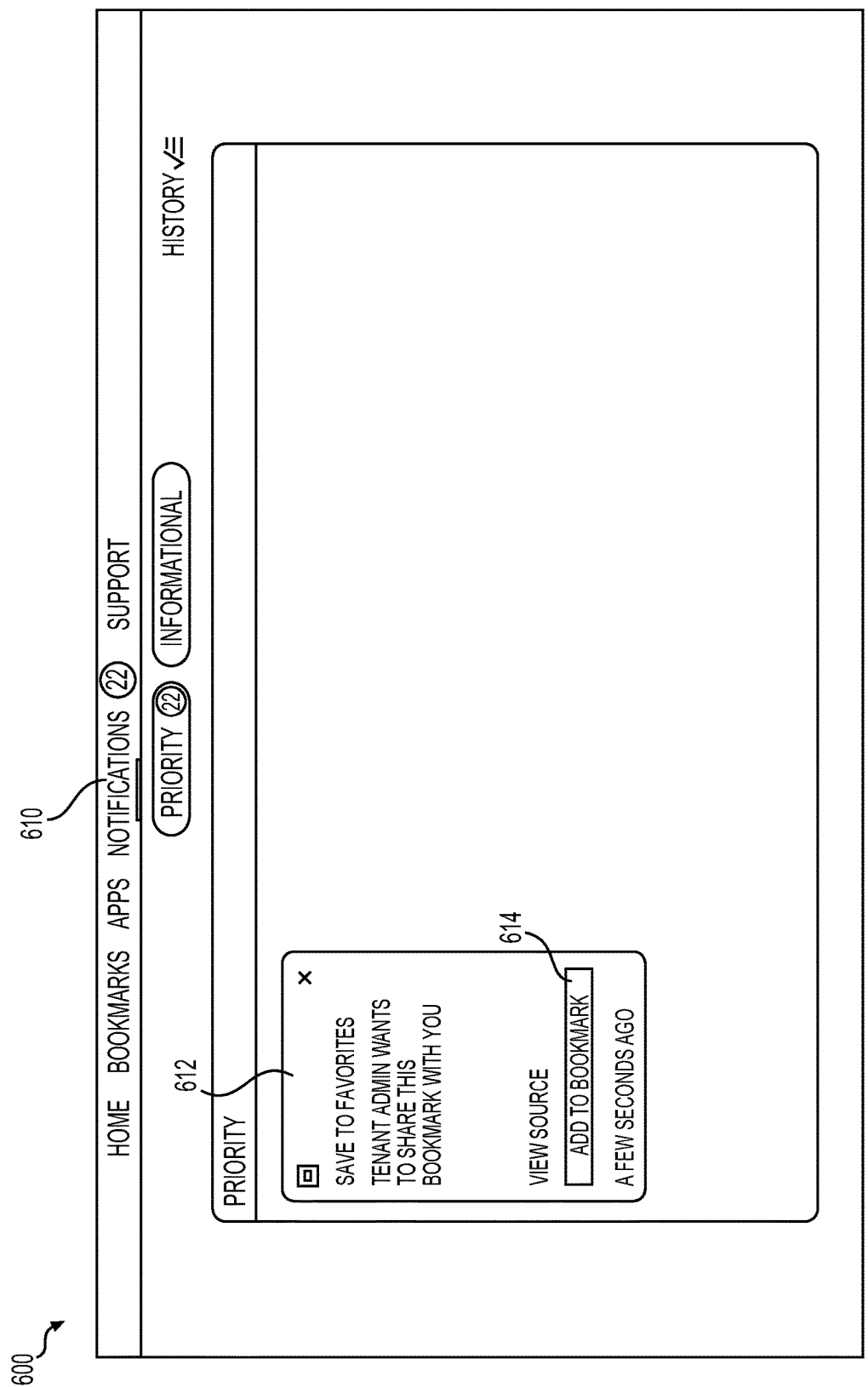

The notification 606 can be interactive. For example, the second user can select the notification 606 to add the bookmark 504 to his user profile 150. The notification 606 can be a pop-up or push notification. The user can also view the notification in the notifications tab 610, which is shown in FIG. 6B. The notifications tab 610 can display notifications for the second user from multiple sources in the enterprise. FIG. 6B shows a notification 612 for the bookmark 504 being shared with the second user. The notification 612 can include an add bookmark button 614 that the user can select to add the bookmark to his user profile 150. Selecting this button can cause the bookmark 504 to be displayed in the web links section of the GUI 600 where the user can quickly access the bookmark 504 and share it with other users in the enterprise.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for content sharing in an enterprise digital space, comprising:
    installing a management application on a user device of a first user in connection with enrolling the user device to be managed by a device management server, the management application configured to enforce one or more security policies received from the device management server on the user device;
    receiving a request for creating a bookmark at the user device of the first user;
    verifying, by the management application, that the bookmark satisfies the one or more security policies for the first user received from the device management server;
    verifying that the first user associated with the request is authorized to save the bookmark;
    based on the verification, saving the bookmark to a user profile for the first user maintained at the device management server;
    receiving a request to share the bookmark with a group of users managed by the device management server;
    retrieving the one or more security policies for each user in the group of users managed by the device management server;
    determining whether the one or more security policies of each user in the group of users allow said each user in the group to access the bookmark;
    for a first set of users in the group that is allowed to access the bookmark, sending the bookmark to a notification service that creates a notification for the bookmark and sends the notification to add the bookmark to the first set of users in the group;
    for a second set of users in the group that is not allowed to access the bookmark, denying the request to share the bookmark with the second set of users in the group;
    receiving, from the first user, a request to appeal the denial of the request to share the bookmark;
    generating a notification of the request to appeal the denial; and
    receiving, in response to the notification, an indication that the denial has been overturned, wherein the notification service, in response to the denial being overturned, sends the notification to add the bookmark to the second set of users in the group.

2. The method of claim 1, wherein verifying that the bookmark satisfies the one or more security policies for the first user further includes determining that a destination identified by the bookmark is accessible using a single sign-on ("SSO") protocol or lightweight directory access protocol ("LDAP").

3. The method of claim 1, wherein the request to share the bookmark is received through a graphical user interface ("GUI") for an application of a Unified Endpoint Management system.

4. The method of claim 1, wherein, in an instance where the bookmark is not verified to satisfy the one or more security policies of the first user, the bookmark is not saved to the user profile of the first user.

5. A non-transitory, computer-readable medium containing instructions that, when executed by a hardware-based processor, causes the processor to perform stages for content sharing in an enterprise digital space, the stages comprising:
    installing a management application on a user device of a first user in connection with enrolling the user device to be managed by a device management server, the management application configured to enforce one or more security policies received from the device management server on the user device;
    receiving a request for creating a bookmark at the user device of the first user;
    verifying, by the management application, that the bookmark satisfies the one or more security policies for the first user received from the device management server;
    verifying that the first user associated with the request is authorized to save the bookmark;
    based on the verification, saving the bookmark to a user profile for the first user maintained at the device management server;
    receiving a request to share the bookmark with a group of users managed by the device management server;
    retrieving the one or more security policies for each user in the group managed by the device management server;
    determining whether the one or more security policies of each user in the group allow said each user to access the bookmark;
    for a first set of users in the group that is allowed to access the bookmark, sending the bookmark to a notification service that creates a notification for the bookmark and sends the notification to add the bookmark to the first set of users in the group;
    for a second set of users in the group that is not allowed to access the bookmark, denying the request to share the bookmark with the second set of users in the group;

receiving, from the first user, a request to appeal the denial of the request to share the bookmark;

generating a notification of the request to appeal the denial; and receiving, in response to the notification, an indication that the denial has been overturned, wherein the notification service, in response to the denial being overturned, sends the notification to add the bookmark to the second set of users in the group.

6. The non-transitory, computer-readable medium of claim 5, wherein verifying that the bookmark satisfies the one or more security policies for the first user further includes determining that a destination identified by the bookmark is accessible using a single sign-on ("SSO") protocol or lightweight directory access protocol ("LDAP").

7. The non-transitory, computer-readable medium of claim 5, wherein the request to share the bookmark is received through a graphical user interface ("GUI") for an application of a Unified Endpoint Management system.

8. The non-transitory, computer-readable medium of claim 5, wherein, in an instance where the bookmark is not verified to satisfy the one or more security policies for the first user, the bookmark is not saved to the user profile of the first user.

9. A system for content sharing in an enterprise digital space, comprising:
   a memory storage including a non-transitory, computer-readable medium comprising instructions; and
   a hardware-based processor that executes the instructions to carry out stages comprising:
      installing a management application on a user device of a first user in connection with enrolling the user device to be managed by a device management server, the management application configured to enforce one or more security policies received from the device management server on the user device;
      receiving a request for creating a bookmark at the user device of the first user;
      verifying, by the management application, that the bookmark satisfies the one or more security policies for the first user received from the device management server;
      verifying that the first user associated with the request is authorized to save the bookmark;
      based on the verification, saving the bookmark to a user profile for the first user maintained at the device management server;
      receiving a request to share the bookmark with a group of users managed by the device management server;
      retrieving the one or more security policies for each user in the group managed by the device management server;
      determining whether the one or more security policies of each user in the group allow said each user to access the bookmark;
      for a first set of users in the group that is allowed to access the bookmark, sending the bookmark to a notification service that creates a notification for the bookmark and sends the notification to add the bookmark to the first set of users in the group;
      for a second set of users in the group that is not allowed to access the bookmark, denying the request to share the bookmark with the second set of users in the group;
      receiving, from the first user, a request to appeal the denial of the request to share the bookmark;
      generating a notification of the request to appeal the denial; and
      receiving, in response to the notification, an indication that the denial has been overturned, wherein the notification service, in response to the denial being overturned, sends the notification to add the bookmark to the second set of users in the group.

10. The system of claim 9, wherein verifying that the bookmark satisfies the one or more security policies for the first user further includes determining that a destination identified by the bookmark is accessible using a single sign-on ("SSO") protocol or lightweight directory access protocol ("LDAP").

11. The system of claim 9, wherein the request to share the bookmark is received through a graphical user interface ("GUI") for an application of a Unified Endpoint Management system.

12. The system of claim 9, wherein, in an instance where the bookmark is not verified to satisfy the one or more security policies for the first user, the bookmark is not saved to the user profile of the first user.

\* \* \* \* \*